United States Patent
Englander

(10) Patent No.: US 9,555,742 B2
(45) Date of Patent: *Jan. 31, 2017

(54) MIRROR MOUNTING ASSEMBLY

(71) Applicant: Rosco Inc., Jamaica, NY (US)

(72) Inventor: Benjamin Englander, Woodmere, NY (US)

(73) Assignee: ROSCO, INC., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,238

(22) Filed: Feb. 7, 2014

(65) Prior Publication Data

US 2014/0327979 A1 Nov. 6, 2014

Related U.S. Application Data

(60) Division of application No. 12/951,636, filed on Nov. 22, 2010, now Pat. No. 8,646,922, which is a division
(Continued)

(51) Int. Cl.
*B60R 1/06* (2006.01)
*G02B 7/182* (2006.01)
(Continued)

(52) U.S. Cl.
CPC .............. *B60R 1/0605* (2013.01); *B60R 1/06* (2013.01); *B60R 1/078* (2013.01); *G02B 7/182* (2013.01);
(Continued)

(58) Field of Classification Search
CPC .......... B60R 1/06; B60R 1/0605; B60R 1/078; G02B 7/182
(Continued)

(56) References Cited

U.S. PATENT DOCUMENTS

| 2,596,632 A | 5/1952 | Whitehead |
| 3,081,057 A | 3/1963 | Farnsworth |

(Continued)

FOREIGN PATENT DOCUMENTS

| EP | 0094187 | 11/1983 |
| FR | 2504872 | 11/1982 |
| JP | 41-1693 | 2/1941 |

OTHER PUBLICATIONS

Bogren, Scott "2001 Vehicle Showroom," Community Transportation, vol. 19, No. 2, pp. 16-35. Jan./Feb. 2001.
(Continued)

*Primary Examiner* — Ricky D Shafer
(74) *Attorney, Agent, or Firm* — Manatt, Phelps & Phillips, LLP

(57) ABSTRACT

A mirror mounting assembly for mounting a mirror on a vehicle bulkhead. The assembly includes a mirror element and a main support arm having a first end and a second end. The mirror element is connected to the first end of the main support arm. The second end of the main support arm is mountable to the vehicle. A pair of brackets are configured to conform to an engine bay side wall of the vehicle. Each bracket has a center portion and two laterally extending flanges that extend at an angle from the center portion in opposite directions. One of the flanges of each bracket is connectable to the bulkhead of the vehicle in the engine bay. A first additional support arm has a first end connected to a first one of the brackets and a second end connected to the main support arm. A second additional support arm has a first end connected to the main support arm and a second end connectable to the vehicle. Finally, a third additional support arm has a first end connected to the main support arm and a second end connectable to the vehicle.

5 Claims, 5 Drawing Sheets

Related U.S. Application Data of application No. 12/147,239, filed on Jun. 26, 2008, now Pat. No. 7,837,338, which is a continuation of application No. 11/442,832, filed on May 30, 2006, now Pat. No. 7,717,576, which is a division of application No. 10/737,238, filed on Dec. 15, 2003, now Pat. No. 7,055,973.

(51) Int. Cl.
  *G11B 5/48* (2006.01)
  *G11B 5/55* (2006.01)
  *G11B 5/56* (2006.01)
  *G11B 5/596* (2006.01)
  *B60R 1/078* (2006.01)

(52) U.S. Cl.
  CPC ........... *G11B 5/4826* (2013.01); *G11B 5/5552* (2013.01); *G11B 5/56* (2013.01); *G11B 5/596* (2013.01); *Y10S 359/90* (2013.01)

(58) Field of Classification Search
  USPC ......... 359/841, 872, 881, 900; 248/479, 486
  See application file for complete search history.

(56) References Cited

U.S. PATENT DOCUMENTS

| | | | |
|---|---|---|---|
| 3,142,469 A | 7/1964 | Clemmer | |
| 3,168,277 A | 2/1965 | Stewart | |
| 3,259,349 A | 7/1966 | Lee | |
| 3,260,490 A | 7/1966 | Trautner | |
| 3,372,897 A | 3/1968 | Lee | |
| 3,395,883 A | 8/1968 | Murgas | |
| 3,415,481 A | 12/1968 | Greenfield | |
| 3,420,490 A | 1/1969 | Malachowski | |
| 3,424,424 A | 1/1969 | Kelley | |
| 3,482,811 A | 12/1969 | Zent | |
| 3,501,122 A | 3/1970 | Barker | |
| 3,601,938 A | 8/1971 | Loomis | |
| 3,608,856 A | 9/1971 | Hurley | |
| 3,729,163 A * | 4/1973 | Cummins | 248/487 |
| 3,778,016 A | 12/1973 | Gernhardt et al. | |
| 3,831,896 A | 8/1974 | Owens | |
| 4,073,461 A | 2/1978 | Lopez et al. | |
| 4,158,451 A | 6/1979 | Lukey | |
| 4,187,702 A | 2/1980 | Benton | |
| 4,368,868 A | 1/1983 | Urban | |
| 4,441,682 A | 4/1984 | Su | |
| 4,500,063 A | 2/1985 | Schmidt et al. | |
| 4,512,634 A | 4/1985 | Stout | |
| 4,830,326 A | 5/1989 | Schmidt et al. | |
| 5,106,049 A | 4/1992 | Schmidt et al. | |
| 5,116,013 A | 5/1992 | Malcolmson | |
| 5,316,257 A | 5/1994 | Schmidt et al. | |
| 5,433,417 A | 7/1995 | Schmidt et al. | |
| 6,361,178 B1 | 3/2002 | Lang et al. | |
| 6,398,375 B1 | 6/2002 | Englander | |
| 6,883,923 B2 | 4/2005 | Englander | |
| 6,962,420 B2 | 11/2005 | Branham | |
| 7,055,973 B2 * | 6/2006 | Englander | 359/841 |
| 7,210,800 B2 * | 5/2007 | Englander | 359/841 |
| 7,252,398 B2 * | 8/2007 | Englander | 359/841 |
| 7,290,891 B2 * | 11/2007 | Englander | 359/841 |
| 7,717,576 B2 * | 5/2010 | Englander | 359/841 |
| 7,837,338 B2 * | 11/2010 | Englander | 359/841 |
| 8,333,479 B2 * | 12/2012 | Englander | 359/841 |
| 8,646,922 B2 * | 2/2014 | Englander | 359/841 |
| 8,696,145 B2 * | 4/2014 | Englander | 359/841 |
| 2010/0226026 A1 | 9/2010 | Englander | |

OTHER PUBLICATIONS

"Vehicle Guide 2002," Community Transportation, Medical Issue, vol. 20, No. 1, pp. 34-37. 2002.

"State Contacts," Community Transportation, vol. 20, No. 2, p. 47. Spring 2002.

* cited by examiner

FIG. 4
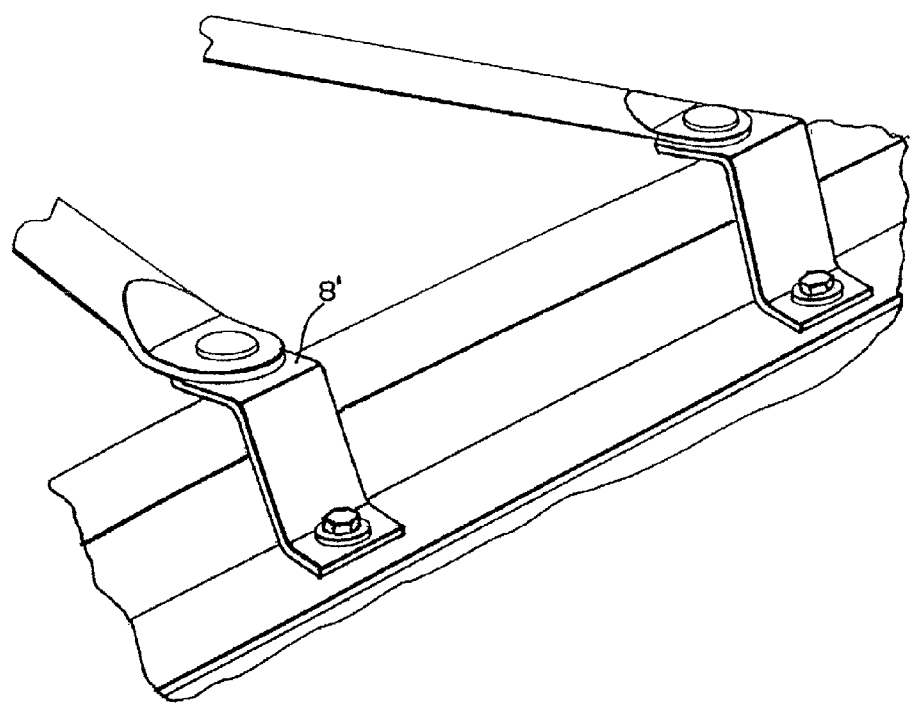
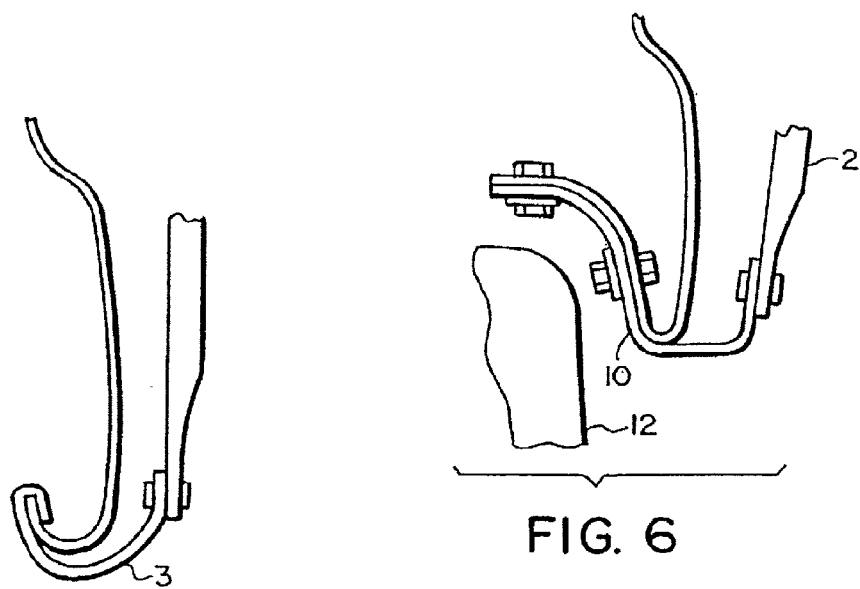
FIG. 5
FIG. 6

MIRROR MOUNTING ASSEMBLY

CROSS-REFERENCE TO RELATED APPLICATIONS

This application is a divisional of U.S. application Ser. No. 12/951,636 filed Nov. 22, 2010, now U.S. Pat. No. 8,646,922, which is a continuation of U.S. application Ser. No. 11/442,832 filed May 30, 2006, now U.S. Pat. No. 7,717,576, which is a divisional application under 37 C.F.R. 1.53(b) of prior U.S. application Ser. No. 10/757,238, filed Dec. 15, 2003, now U.S. Pat. No. 7,055,973, by Benjamin Englander entitled MIRROR MOUNTING ASSEMBLY, the entire contents of all of which are incorporated herein by reference. This application is also related to U.S. application Ser. No. 11/442,833, filed May 30, 2006, now U.S. Pat. No. 7,210,800, U.S. application Ser. No. 11/362,637, filed Feb. 27, 2006 now U.S. Pat. No. 7,252,398, U.S. application Ser. No. 11/784,402 filed Apr. 6, 2007, now U.S. Pat. No. 7,290,891, U.S. application Ser. No. 12/147,239, filed Jun. 26, 2008, now U.S. Pat. No. 7,837,338, U.S. application Ser. No. 12/782,135, filed May 18, 2010, now U.S. Pat. No. 8,333,479, all of which are incorporated herein by reference.

BACKGROUND OF THE INVENTION

Field of the Invention

The present invention relates to a mounting assembly for mounting a mirror to a motor vehicle.

Description of the Prior Art

Side view mirrors which are used on buses and trucks are well known in the art as evidenced by U.S. Pat. Nos. 3,395,883, 4,368,868, 4,500,063, 4,512,634, 5,106,049 and 5,316,257, the contests of which are incorporated by reference herein.

It is desirable for such mirrors to be mounted so that the driver can see both in front of the vehicle, as well as toward the rear of the vehicle. This is generally accomplished by mounting the mirror as far forward on the vehicle as possible, as well as laterally projecting from the vehicle. This type of mounting of course requires elongated mounting arms which increase the vibration of the mirror. Furthermore, in the prior art mirrors, the mounting arms are generally fixed to the body panels of the vehicle which also vibrate during operation of the vehicle and thus leads to an even greater vibration of the mirror.

The mounting of the mirror mounting assembly to the body panels requires drilling holes in the body panels. These holes, especially those made in the fender of the vehicle in the vicinity of the wheel well, expose the bare metal of the body panel to moisture which leads to rust and corrosion developing in the area of the mounting hole. Due to the relatively thin metal used in constructing motor vehicles, in a very short period of time the area around the mounting hole becomes rusted and is no longer structurally sound and thus is no longer able to adequately hold the mounting assembly. This results in having to either repair the body panel and remount the mounting assembly or move the mounting assembly to another location which entails drilling new holes in the body panel. This in turn leaves the body panel in the area of the previously-drilled holes to further deteriorate.

Detachable mirrors are also known, as evidenced by U.S. Pat. No. 3,395,883. This mounting utilizes a clamp that engages around the lip of the wheel well of the vehicle and feet that contact the inner face of the fender edge forming the engine compartment. The feet are held in place by tension generated by a rubber element that extends between the feet at the engine compartment and the clamp at the wheel well. The problem with this type of device is that it is easily removed and is thus subject to theft. Furthermore, since the mounting arms are mounted to the body panel there is also the problem of vibrations being amplified by the mounting arms.

SUMMARY OF THE INVENTION

Accordingly, it is an object of the present invention to provide a mounting bracket for a rear view mirror which alleviates the vibration and mounting problems associated with the prior art devices.

Pursuant to this object and others which will become apparent hereafter, one aspect of the present invention resides in a mirror mounting bracket in which the mounting bracket has at least two arms that are mounted directly to the vehicle bulkhead. This mounting of the bracket arms to the bulkhead avoids the vibrations created in the body panel. The mounting bracket also does not require any holes to be drilled in the exterior of the body panel. These two arms of the bracket are configured at one end to be mountable at the engine bay at, preferably, the same points at which the fender is fastened to the vehicle bulkhead or frame.

In a preferred embodiment of the invention, the ends of the arms are mounted to the bulkhead using a bracket having a longitudinal central portion and a laterally projecting flange at each end of the central portion. The flanges project from the central portion in opposite directions. One of the flanges is mounted to the bulkhead in the engine compartment so that the central portion extends above the upper edge of the engine compartment and the other flange extends laterally away from the engine compartment. The exposed end of the bracket has one of the arms of the mounting construction mounted to it. The central portion of the bracket fits between the side edge of the vehicle hood and the wall of the engine compartment when the hood is closed.

At least one additional mounting arm connects the mirror to the vehicle body to provide a stable, at least three point mounting at the side of the vehicle. This additional mounting can be provided either by clipping the end of the arm around the edge of the wheel well, mounting the arms directly to the body panel of the vehicle or, mounting the arm to the bulkhead or frame of the vehicle by either a bolt that passes through the body panel and the bulkhead or, having a bracket mounted inside the wheel well to the bulkhead so that the bracket extends from the wheel well and is connected to the mounting arm.

In another embodiment of the invention, a single bracket is mounted to the bulk head. The bracket is substantially Z-shaped wherein a first leg of the Z that is mounted to the bulkhead has a width sufficient to extend over two mounting holes of the bulkhead. The other leg of the Z-shaped bracket is substantially narrower. A connecting web between the two legs of the Z-shaped bracket has a width that decreases from the wide leg to the narrow leg. The narrow leg of the bracket extends from the engine compartment. The two arms of the mounting bracket are pivotally mounted to a support member. The support member is mounted at one end to the narrow, exposed leg of the Z-shaped bracket. Furthermore, the support member is shaped to follow the contour of the vehicle fender SQ that the support member rests against the fender. In order to avoid scratching of the vehicle fender, a padding material is provided between the support member and the fender.

For a more complete understanding of the vehicle mounting assembly of the present invention, reference is made to the following detailed description and accompanying drawings in which the presently preferred embodiments of the invention are illustrated by way of example. That the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 4 shows the embodiment of FIG. 2 fastened to the engine bay bulkhead;

FIG. 5 shows a clip mounted to the wheel well lip;

FIG. 6 shows a bracket mounted in the wheel well;

DETAILED DESCRIPTION OF THE INVENTION

Figure 1:
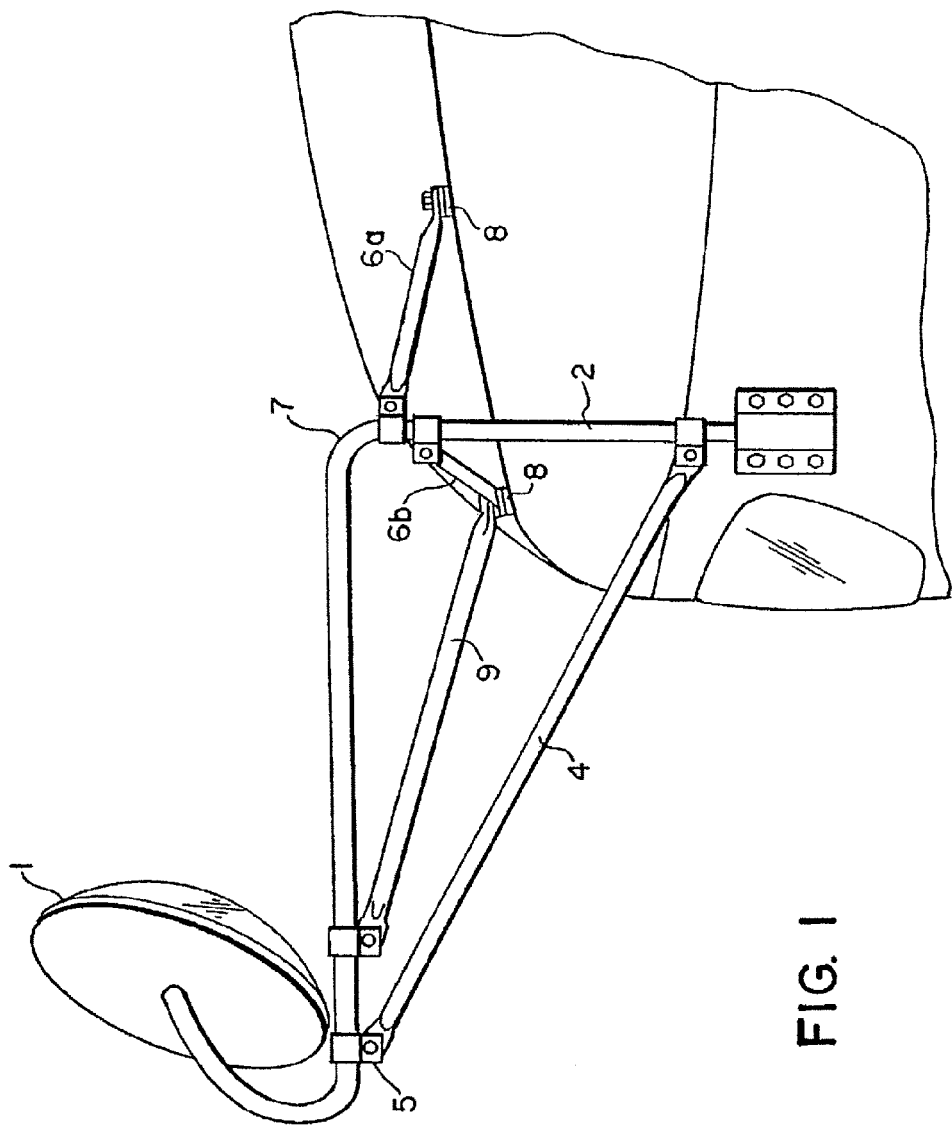
FIG. 1 is a perspective view of a first embodiment of the mirror mounting assembly of the present invention.
Figure 2:
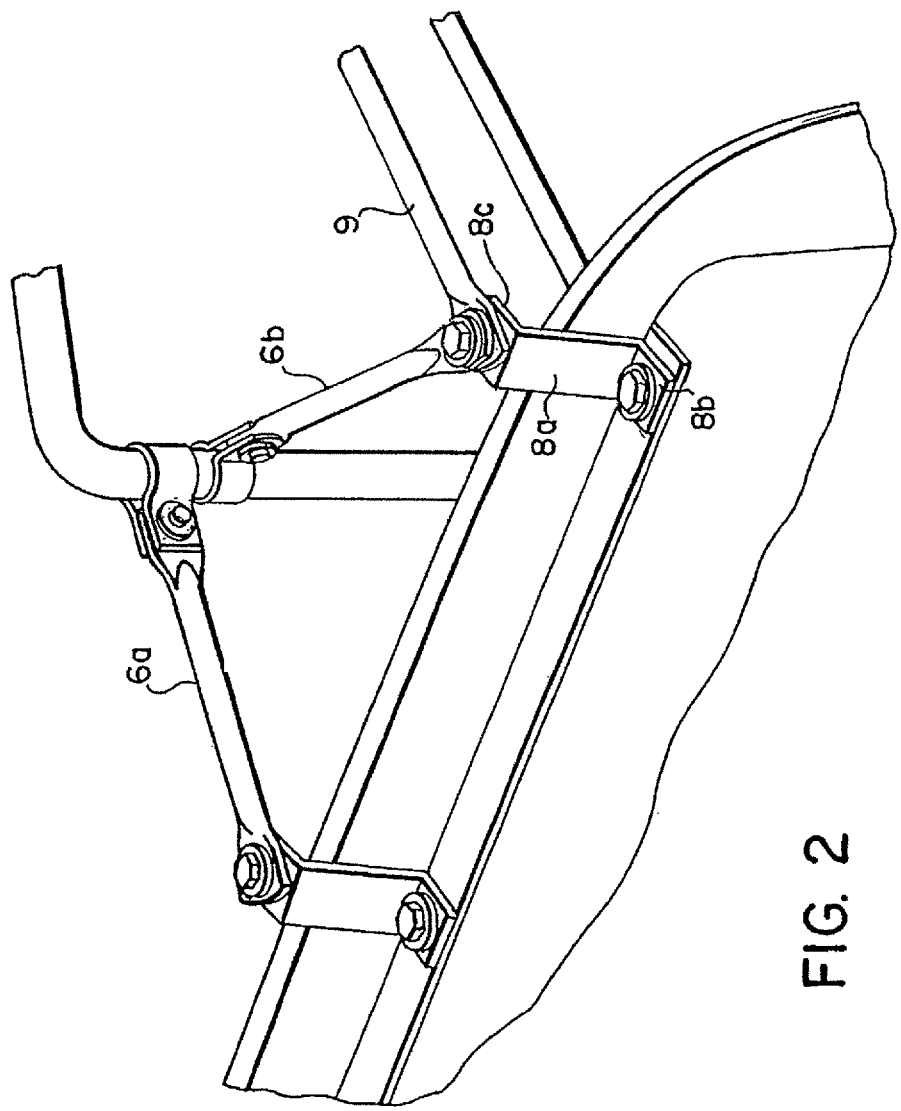
FIG. 2 is a view showing the fastening of the embodiment of FIG. 1 to the engine bay bulkhead.

As can be seen in FIG. 1, a first embodiment of the inventive mirror mounting assembly has a mirror element 1 mounted to one end of a main support member 2. In this embodiment, the main support member 2 has a substantially L-shape. The mirror 1 is attached to the free end of the long leg of the L-shaped support member 2. The end of the short leg of the support member 2 is attachable to the vehicle, via the un-numbered arm support which is attached to the vehicle by screws (un-numbered). This type of mount shown in FIGS. 1, 7 and 8, which is attached by screws (or bolts) to the vehicle is well known in the art. This end of the support member 2 can be attached either directly to the vehicle panel as shown in FIG. 1, or can be clipped around the edge of the wheel well by a bracket or clip 3 attached to the end of the support member 2 (see FIG. 5), A support arm 4 extends between the free end of the long leg of the L-shaped support member 2 and the end of the short leg of the L-shaped support member 2. The support arm 4 can be attached to the support member 2 in any one of a variety of ways, including clamping 5 or welding. Two additional support arms 6a, 6b extend from the short leg of the L-shaped support member in a region of the angled portion 7 of the support member 2 connecting the legs. The additional support arms 6a, 6b have a first end that is connected to the support member 2 by, for example, clamps. The second end of the support arms 6a, 6b is attached to a bracket 8 that is configured to be mounted to the bulkhead or frame of the vehicle in the vicinity of the engine compartment. This mounting can be better seen in FIG. 2.

The brackets 8 are folded members having a central portion 8a and two end flanges 8b, 8c which extend laterally from the central portion 8a in opposite directions. The end flange 8b is connectable to the bulkhead or frame, preferably by the same bolt which mounts the fender body panel to the frame. The angle between the flange 8b and the main portion 8a of the bracket is such that the main portion 8a follows the surface of the fender forming the perimeter of the engine compartment. The central portion 8a of the bracket has a thickness so as to permit the vehicle hood to open and close without interference. The other flange 8c of the bracket provides a mounting point for the support arm 6a, 6b.

In order to further stabilize the mirror, a further support arm 9 has one end connected to the bracket 8a on which the support arm 6b is mounted. The other end of the support arm 9 is connected to the end of the long leg of the L-shaped support member 2.

The unique construction of the brackets and support arms allows the mounting assembly to be fixed to the bulkhead of the vehicle thereby reducing vibration of the mirror.

The end of the short leg of the support member 2 can be mounted to the body panel of the vehicle by a conventional bracket as shown in FIG. 1. FIG. 5 illustrates the clip 3 which permits the support member 2 to be mounted to the wheel well thereby avoiding the necessity for drilling holes in the exterior of the body side panel. An alternative mounting is shown in FIG. 6. In this embodiment, a bracket 10 is mounted to the inside of the wheel well and preferably is connected through the wheel well to the bulkhead. The bracket 10 follows the contour of the wheel well so as to avoid interference with the wheel 12 of the vehicle and projects from the wheel well to a position where it is connected to the support member 2.

This embodiment completely avoids the necessity of drilling holes in the exterior body panel and therefore avoids the problems encountered and presented by such holes.

The end of the support member 2 to which the mirror element 1 is mounted is curved upwardly and has a through hole for mounting the mirror element 1 in a conventional manner which allows pivoting of the mirror element 1.

Figure 3:
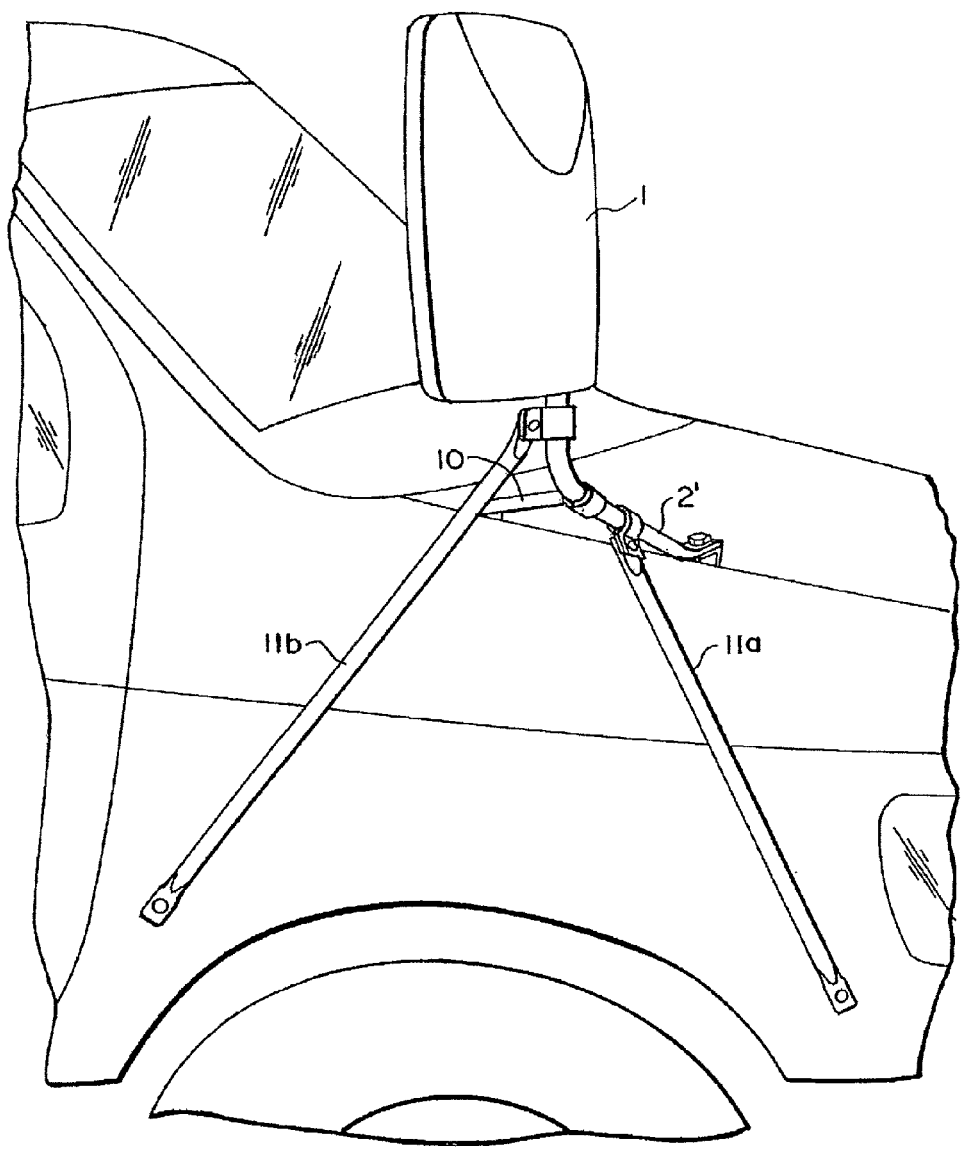
FIG. 3 shows a second embodiment of the mirror mounting assembly of the invention.

FIG. 3 shows an alternative embodiment of the invention in which the mirror element 1 is mounted to one end of a main support member 2'. The main support member 2' is bent at an angle so as to form two legs. The mirror element 1 is mounted to one of the legs while the other of the legs is mounted at its free end to a bracket 8' which is connectable to the bulkhead of the vehicle in the engine compartment as discussed above in connection with the embodiment of FIG. 1. A further support arm 10 extends between another bracket 8' connected to the bulkhead and a region of the main support member 2' near the bend therein.

A support arm 11a has one end connected to the main support member 2' at a position between the end of the support member 2' connected to the bracket 8' and the angled region of the support member 2'. The second end of the support arm 11a is connectable to the vehicle in a manner similar to the short leg of the support member 2 discussed above in connection with the embodiment of FIG. 1. In other words, the second end of the support arm can be attached either by a conventional bracket or by the brackets as shown in FIGS. 5 and 6. Yet another support arm 11b has one end attached to the support member 2' adjacent the mirror element 1, and another end that is attachable to the vehicle in a manner similar to the support arm 11a.

FIG. 4 shows the mounting brackets 8'. In this embodiment, the flanges of the bracket are not at a 90° angle to the main portion of the bracket. The angle is selected so as to correspond to the side wall of the engine compartment opening so as to permit opening and closing of the vehicle hood.

Figure 7:
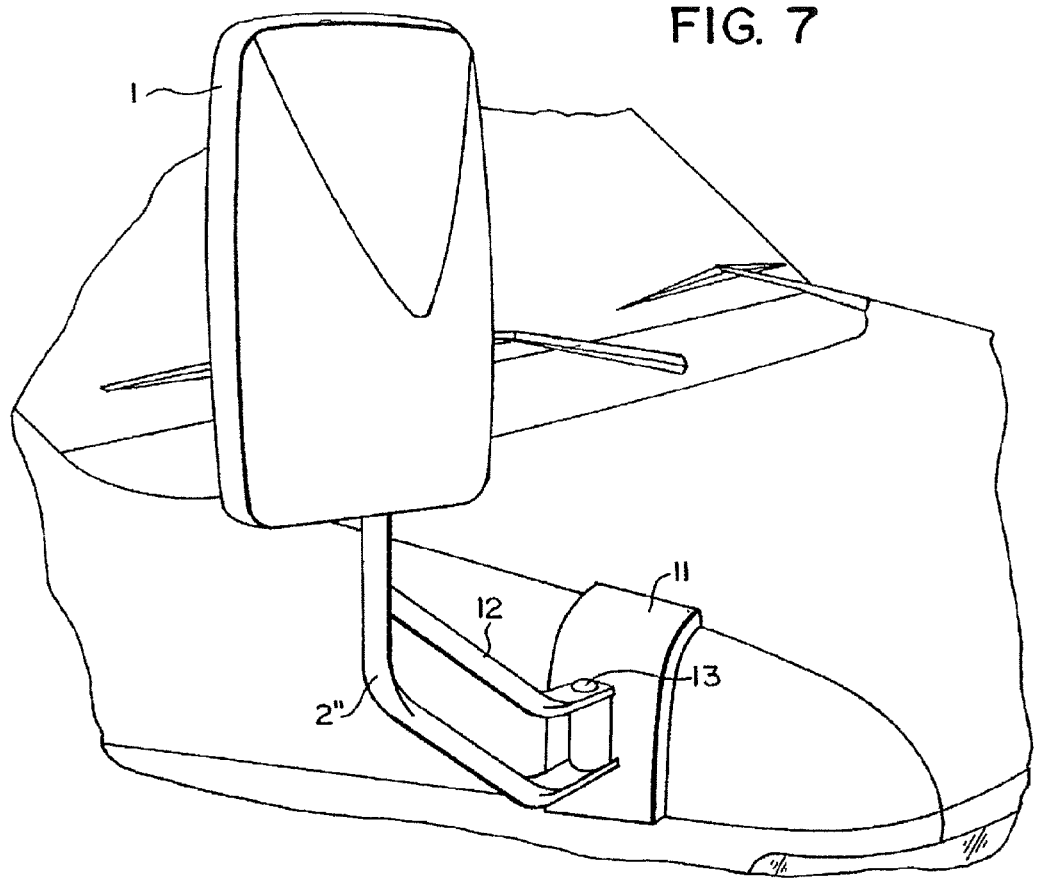
FIG. 7 shows a third embodiment of the mirror mounting assembly.
Figure 8:
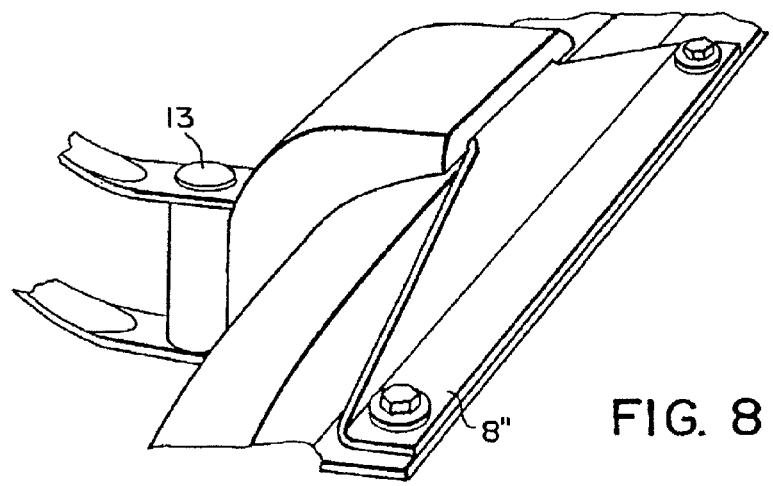
FIG. 8 shows the embodiment of FIG. 7 mounted to the engine bay bulkhead.

FIG. 7 shows another embodiment of the invention in which the mirror element 1 is mounted to one end of a main support member 2". The main support member 2" is bent at an angle so as to form two legs, The mirror element 1 is mounted to one of the legs while the other of the legs is mounted at its free end to a support member 11. The support member 11 is configured on one side to substantially conform to the shape of the vehicle fender. Essentially, the support member 11 is L-shaped, with a short leg of the L resting on the top of the fender adjacent the engine compartment opening, and the longer leg extending downwardly along the fender of the vehicle. As shown in FIG. 8, the short leg of the support member 11 is attached to a mounting bracket 8" that differs from the brackets 8 and 8' in that the flange of the bracket 8" which is mounted to the bulkhead or frame is of a width sufficient to be connected to the bulkhead by two bolts. The other flange of the bracket 8" which projects laterally from the engine compartment is smaller than the flange mounted to the bulkhead. The web connecting the two flanges is tapered from one flange to the other. The support member 11 is fixed to the smaller flange of the bracket 8". This fixing can be accomplished in a number of ways, including screwing, gluing, snap fitting, etc. The wide dimension of the bracket flange mounted to the bulkhead provides stability for the mirror in the longitudinal direction of the vehicle. The main support member 2" is connected to the support member 11 by a pin 13 so that the mirror and the support member can pivot about a vertical axis. A further support arm 12 is connected between the pin 13 and the leg of the support member 2" to which the mirror is connected. The arm 12 provides lateral stability to the mirror.

In order to prevent scratching of the fender, it is possible to provide a barrier member such as a rubber or fabric layer between the support member 11 and the vehicle fender. The barrier member can be mounted to the surface of the support member 11 facing the fender.

While the mirror mounting assembly has been described in conjunction with specific embodiments, it is evident that many alternatives, modifications and variations will be apparent to those skilled in the art in light of the disclosure herein. It is intended that the meets and bounds of the invention be determined by the appended claims rather than by the language of the above specification, and that all such alternatives, modifications and variations which form a function or co-jointly or cooperative equivalent are intended to be included within the spirit and scope of these claims.

What is claimed is:

1. In a mirror assembly for a vehicle, wherein the vehicle includes: a vehicle bulkhead; a hood movably connected to the vehicle bulkhead, the hood movable between an open and a closed position, and a body panel having a top portion and a side portion, wherein the body panel includes at least one fender secured to the vehicle bulkhead by a plurality of mounting bolts disposed in mounting holes, and wherein the mirror assembly includes: a mirror arm assembly including a first end and a second end, a mirror element being connected to the first end; a mirror support bracket including a first side and a second side, the first side being connected to the mirror arm assembly and the second side configured to substantially continuously engage and rest on the side portion of the body panel, the second side configured to substantially continuously engage and rest on the top portion of the body panel, and a bracket, the bracket including a first extending section, the first section being connected to the mirror support bracket, the second section including at least one through hole, a method of installing the mirror assembly comprising steps of:

providing the mirror assembly for attachment to the vehicle using the mirror support bracket and the mirror arm assembly;

opening the hood of the vehicle to the open position;

placing the second section of the mirror assembly so that the at least one through hole is co-extensive with a location for at least one mounting hole;

engaging and resting the second side of the mirror support bracket on the side portion of the body panel;

engaging and resting the second side of the mirror support bracket on the top portion of the body panel; and placing at least one mounting bolt through the through hole of the second section and through the at least one mounting hole.

2. The method as recited in claim 1, wherein:

said placing the second section is performed so that extending through holes are co-extensive with at least two mounting holes; and said placing the at least one mounting bolt is performed so that at least two mounting bolts are placed through the at least two through holes and through the second section.

3. The method as recited in claim 1, wherein the bracket provides stability for the mirror assembly in the longitudinal direction of the vehicle.

4. The method as recited in claim 1, wherein the bracket is configured to have a contour that substantially follows a wall of an engine compartment and a side edge of the vehicle hood.

5. The method as recited in claim 1, wherein the bracket is configured to have a contour that substantially follows an interior surface of the body panel, including the fender portion of a vehicle forming a perimeter of the vehicle's engine compartment.

\* \* \* \* \*